US009029018B2

(12) United States Patent
Yang et al.

(10) Patent No.: US 9,029,018 B2
(45) Date of Patent: May 12, 2015

(54) METHOD FOR MAKING LITHIUM BATTERY CATHODE MATERIAL

(75) Inventors: Gai Yang, Beijing (CN); Chang-Yin Jiang, Beijing (CN); Jian Gao, Beijing (CN); Jie-Rong Ying, Beijing (CN); Jian-Jun Li, Beijing (CN); Xiang-Ming He, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 553 days.

(21) Appl. No.: 12/978,649

(22) Filed: Dec. 27, 2010

(65) Prior Publication Data

US 2011/0297875 A1    Dec. 8, 2011

Related U.S. Application Data

(63) Continuation of application No. 12/965,850, filed on Dec. 11, 2010, now abandoned.

(30) Foreign Application Priority Data

Jun. 3, 2010  (CN) ............................ 2010 1 0191050
Jun. 3, 2010  (CN) ............................ 2010 1 0191051
Jun. 3, 2010  (CN) ............................ 2010 1 0191130
Jun. 3, 2010  (CN) ............................ 2010 1 0191251

(51) Int. Cl.
*H01M 4/04*    (2006.01)
*H01M 4/88*    (2006.01)
(Continued)

(52) U.S. Cl.
CPC .......... *H01M 4/5825* (2013.01); *H01M 10/052* (2013.01)

(58) Field of Classification Search
CPC ..... H01M 4/04; H01M 4/0471; H01M 4/485; H01M 4/525; H01M 4/581; H01M 4/582; H01M 4/5825; H01M 10/052

USPC ................ 429/221, 231.2, 231.8; 252/182.1, 252/520.4, 521.2, 521.6; 502/101, 208; 427/126.1

See application file for complete search history.

(56) References Cited

U.S. PATENT DOCUMENTS 5,583,240 A  * 12/1996  Asher et al. ..................... 554/98
2001/0016631 A1*  8/2001  Freitag et al. .................... 526/65

(Continued)

FOREIGN PATENT DOCUMENTS

CN           1635648          7/2005
CN           1635648 A   *    7/2005  .............. H01M 4/04

(Continued)

OTHER PUBLICATIONS

SIPO abstract and machine translation for Ying et al., CN 1635648 A.*

(Continued)

*Primary Examiner* — Edu E Enin-Okut
(74) *Attorney, Agent, or Firm* — Novak Druce Connolly Bove + Quigg LLP

(57) ABSTRACT

A method for making a lithium battery cathode material is disclosed. A mixed solution including a solvent, an iron salt material, a vanadium source material and a phosphate material is provided. An alkaline solution is added in the mixed solution to make the mixed solution have a pH value ranging from about 1.5 to 5. The iron salt, the vanadium source material and the phosphate material react with each other to form a plurality particles of iron phosphate precursor doped with vanadium which are added in a mixture of a lithium source solution and a reducing agent to form a slurry of lithium iron phosphate precursor doped with vanadium. The slurry of lithium iron phosphate precursor doped with vanadium is heat-treated.

20 Claims, 24 Drawing Sheets

(51) Int. Cl.
  *H01B 1/08* (2006.01)
  *B01J 27/00* (2006.01)
  *H01M 4/58* (2010.01)
  *H01M 10/052* (2010.01)

(56) References Cited

U.S. PATENT DOCUMENTS

2008/0008938 A1* 1/2008 Wu et al. ............... 429/221
2012/0058039 A1* 3/2012 Huang ................... 423/306

FOREIGN PATENT DOCUMENTS

| CN | 101337666 A | * | 1/2009 | ............ C01B 25/45 |
|---|---|---|---|---|
| CN | 101692488 | | 4/2010 | |
| CN | 101692488 A | * | 4/2010 | ............ H01M 4/04 |
| JP | 2006239665 A | * | 9/2006 | ............ B01J 8/20 |
| TW | 200805734 | | 1/2008 | |

OTHER PUBLICATIONS

Partial SIPO translation for Cheng et al., CN 101692488 A.*
Machine translation for Bienvenu, JP 2006-239665 A.*
Machine translation for Ying et al., CN 101337666 A.*
"Sucrose". CSID: 5768. ChemSpider—The Free Chemical Database. Royal Society of Chemistry. http://www.chemspider.com/Chemical-Structure.5768.html (accessed 14:31, Mar. 26, 2013).*

* cited by examiner

Providing a plurality of lithium vanadium phosphate particles

↓

Forming a lithium iron phosphate layer on an outer surface of each lithium vanadium phosphate particle

FIG. 6

METHOD FOR MAKING LITHIUM BATTERY CATHODE MATERIAL

RELATED APPLICATIONS

This application is a continuation application of U.S. patent application Ser. No. 12/965,850, filed on Dec. 11, 2010, entitled "LITHIUM BATTERY CATHODE COMPOSITE MATERIAL," which claims all benefits accruing under 35 U.S.C. §119 from China Patent Applications No. 201010191050.4, filed on Jun. 3, 2010; No. 201010191051.9, filed on Jun. 3, 2010; 201010191130.X, filed on Jun. 3, 2010; and 201010191251.4, filed on Jun. 3, 2010, in the China Intellectual Property Office, the contents of which are hereby incorporated by reference.

BACKGROUND

1. Technical Field

The present disclosure relates to cathode material of lithium batteries and methods for fabricating the same.

2. Description of Related Art

Lithium batteries are used in various portable devices, such as notebook PCs, mobile phones, and digital cameras because of their small weight, high discharge voltage, long cyclic life, and high energy density compared with conventional lead storage batteries, nickel-cadmium batteries, nickel-hydrogen batteries, and nickel-zinc batteries.

Among various cathode materials, transition metal oxides and mixed transition metal oxides have received much attention because of their relatively high charge/discharge capacities in the lithium batteries. Lithium iron phosphate (e.g. $LiFePO_4$), and lithium vanadium phosphate (e.g. $Li_3V_2(PO_4)_3$) are two widely used cathode active materials. Lithium iron phosphate has the advantage of high specific capacity, but has the disadvantage of bad performance at low temperatures. Lithium vanadium phosphate has good performance at low temperatures, but low specific capacity. As such, there is a composite cathode material including both lithium iron phosphate and lithium vanadium phosphate provided in, "Improving electrochemical properties of lithium iron phosphate by addition of vanadium," Yang M R, Ke W, Wu S H. J Power Sources, 2007, 165: 646-650. However, in the composite cathode material, lithium iron phosphate and lithium vanadium phosphate are disorderly disposed, which means that some of the lithium iron phosphate cannot contact with the electrolyte when used in a lithium battery. As such, lithium iron phosphate cannot be dispersed in the electrolyte easily and quickly, thereby negatively impacting electrochemical properties of the electrode material of the lithium battery.

What is needed, therefore, is a lithium battery cathode composite material and method for making the same that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 6 is a flow chart of a method for making the lithium battery cathode composite material according to one embodiment.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
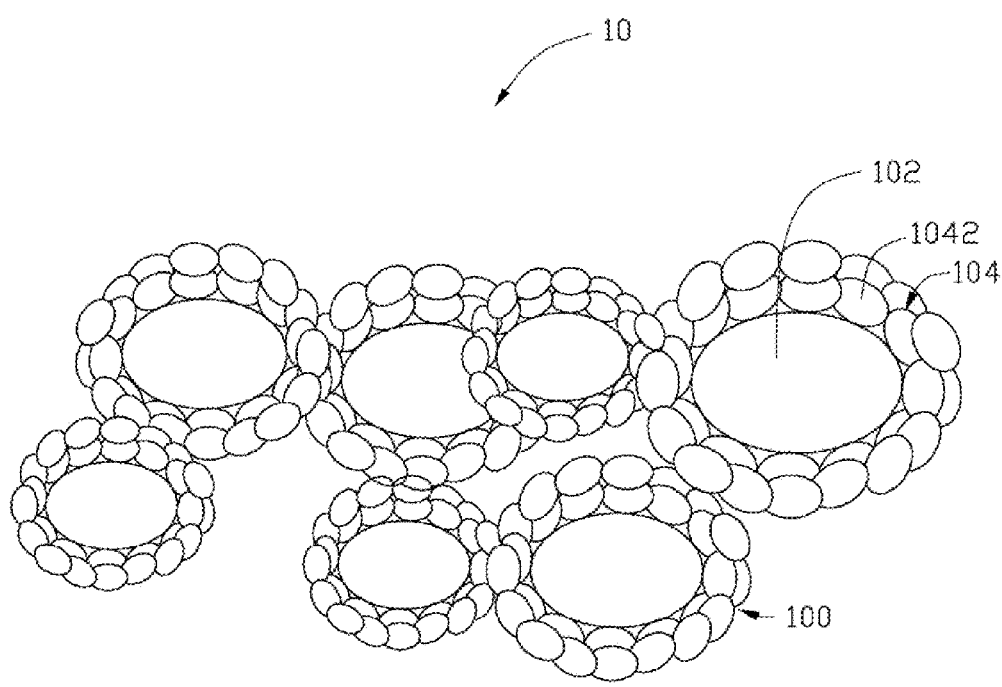
FIG. 1 is a schematic view of a lithium battery cathode composite material structure according to a first embodiment.
Figure 2:
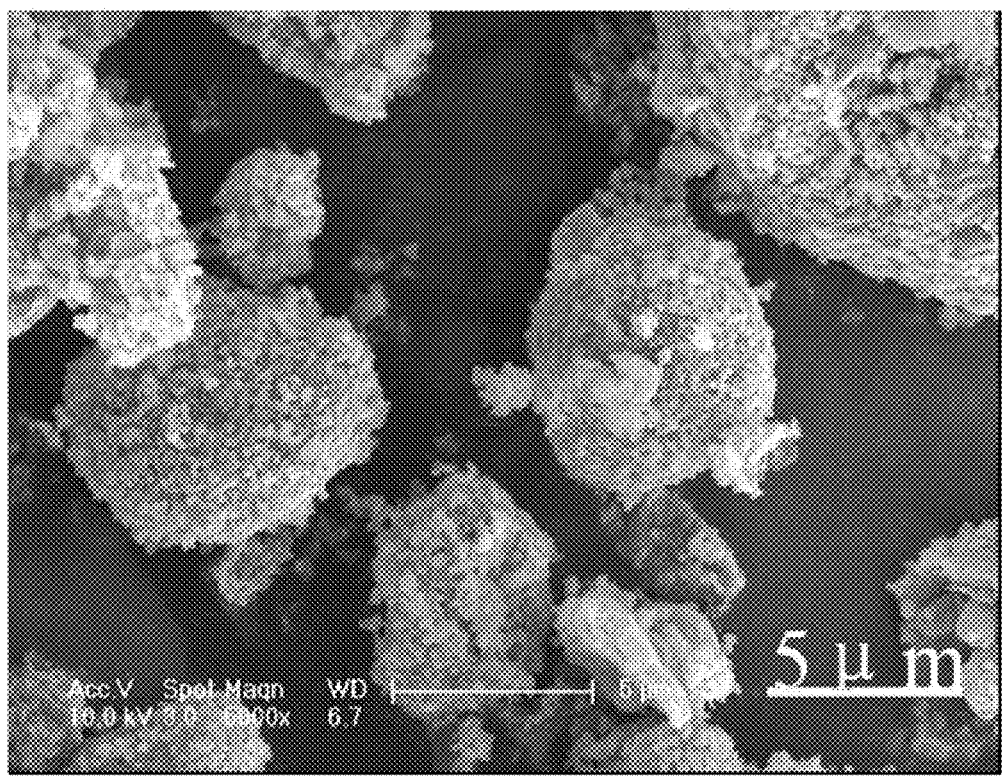
FIG. 2 is a Scanning Electron Microscope (SEM) Image of the lithium battery cathode composite material in FIG. 1.

Referring to FIGS. 1 and 2, a lithium battery cathode composite material 10 according to a first embodiment is shown. The lithium battery cathode composite material 10 includes a plurality of composite particles 100. The composite particles 100 have core-shell structures. Each composite particle 100 includes one lithium vanadium phosphate particle 102 and a lithium iron phosphate layer 104 covering the lithium vanadium phosphate particle 102. The lithium vanadium phosphate particle 102 can be considered a "core," and the lithium iron phosphate layer 104 can be considered a "shell."

The lithium vanadium phosphate particle 102 can be ball-shaped or almost ball-shaped. A diameter of the lithium vanadium phosphate particle 102 is in a range from about 1 micrometer to about 50 micrometers. In other embodiments, the diameter of the lithium vanadium phosphate particle 102 is in a range from about 5 micrometers to about 20 micrometers. In the embodiment according to FIGS. 1 and 2, the diameter of the lithium vanadium phosphate particle 102 is about 10 micrometers.

A weight ratio between the lithium iron phosphate layer 104 and the lithium vanadium phosphate particle 102 is larger than 1.5. The lithium iron phosphate layer 104 includes a plurality of lithium iron phosphate particles 1042. The plurality of lithium iron phosphate particles 1042 is disposed on an outer surface of the lithium vanadium phosphate particle 102. Each of the lithium iron phosphate particles 1042 can be ball-shaped or almost ball-shaped. A diameter of each lithium iron phosphate particle 1042 can be in a range from about 50 nanometers to about 10 micrometers. In other embodiments, the diameter of the lithium iron phosphate particles 1042 can be in a range from about 100 nanometers to about 500 nanometers. The diameter of the lithium iron particles 1042 cannot be too large in the instance the lithium iron particles 1042 fall off the lithium vanadium particle 102. In the embodiment according to FIGS. 1 and 2, the diameter of the lithium iron phosphate particles 1042 is in a range from about 100 nanometers to about 200 nanometers. The lithium iron phosphate layer 104 has a large specific surface area because the lithium iron phosphate particles 1042 are ball-shaped or almost ball-shaped and have small diameter.

A thickness of the lithium iron phosphate layer 104 can be less than 10 micrometers. In one embodiment according to FIGS. 1 and 2, the thickness of the lithium iron phosphate layer 104 is about 2 micrometers. The lithium iron phosphate layer 104 further includes a plurality of pores defined by adjacent lithium iron phosphate particles 1042.

In the composite particles 100 having core-shell structures, because the "shell" (lithium iron phosphate layer) 104 has a large specific surface area, the "shell" 104 has a large contact area with an electrolyte when the lithium battery cathode composite material 10 is used in a battery, and the lithium iron phosphate particles 1042 can be dispersed easily and quickly in the electrolyte. Further, the shell 104 includes a plurality of pores which can ensure the contact area between the composite particles 100 and the electrolyte is sufficient, and the "core" (lithium vanadium phosphate particle) 102 can also contact the electrolyte. As such, the lithium ions in the lithium battery cathode composite material 10 can be fully dispersed in the electrolyte. Furthermore, the core 102 can be considered an active supporter of the shell 104, which further ensures the lithium iron phosphate particles 1042 inside the shell 104 also disperse in the electrolyte. As such, the lithium battery cathode composite material 10 can be well dispersed in the electrolyte.

Figure 3:
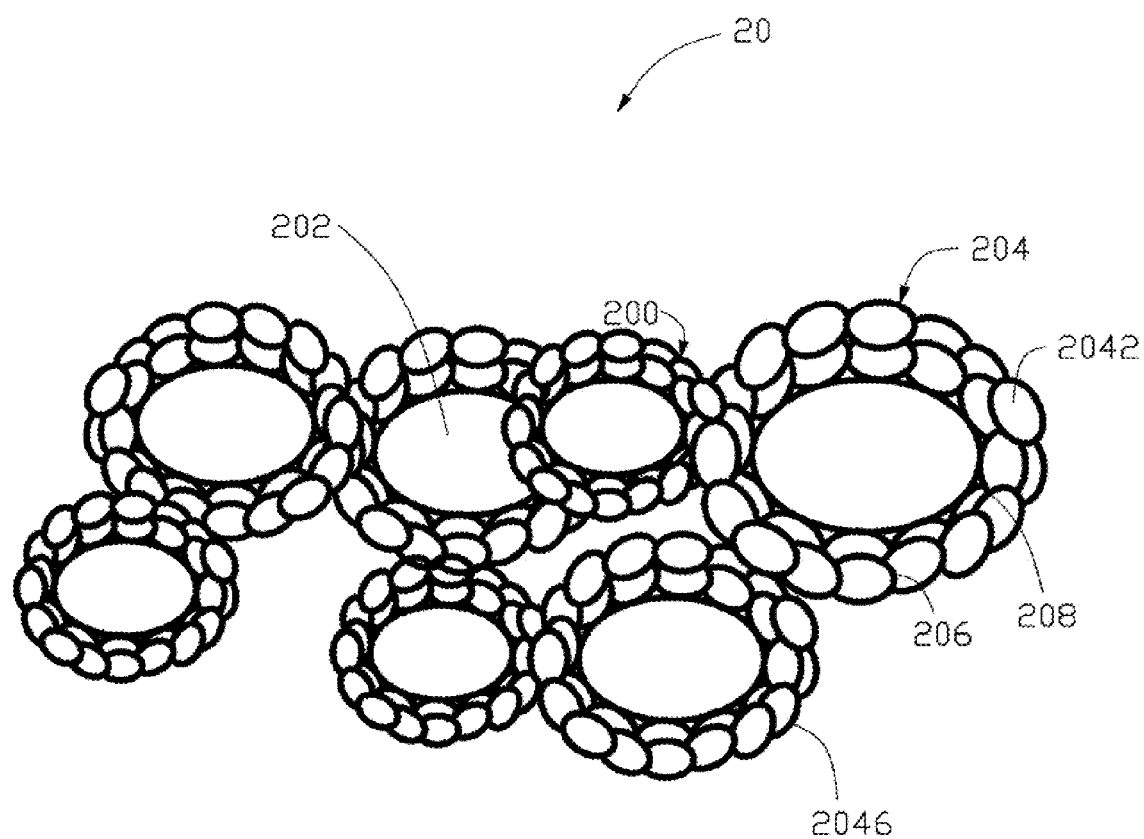
FIG. 3 is a schematic view of a lithium battery cathode composite material doped with carbon structure according to a second embodiment.

Referring to FIG. 3, a lithium battery cathode composite material 20 according to a second embodiment is shown. The lithium battery cathode composite material 20 includes a plurality of composite particles 200. The composite particles 200 have core-shell structures. Every composite particle 200 includes one lithium vanadium phosphate particle 202 and a lithium iron phosphate layer 204 covering the lithium vanadium phosphate particle 202. The lithium iron phosphate layer 204 includes a plurality of lithium iron phosphate particles 2042.

Each of the composite particles 200 includes carbon material. The carbon material in the composite particles 200 can exist as a carbon layer or carbon particles. A weight ratio between the carbon material in each composite particle 200 and the lithium vanadium phosphate particle 202 can be in a range from about 0.005 to about 0.1, particularly, the weight ratio between the carbon material and the lithium vanadium phosphate particle 202 can be in a range from about 0.02 to about 0.05.

In one example, the composite particle 200 can include a carbon layer 208 disposed between the lithium vanadium phosphate particle 202 and the lithium iron phosphate layer 204. The carbon layer 208 is disposed on an outer surface of the lithium vanadium phosphate particle 202. The carbon layer 208 can improve the conductivity of the composite particle 200, and further improve the conductivity of the lithium battery cathode composite material 20.

In another example, the lithium iron phosphate layer 204 can further include a plurality of carbon particles 206 dispersed in the lithium iron phosphate particles 2042. Each of the carbon particles 206 can be disposed between adjacent lithium iron phosphate particles 2042. The carbon particles 206 can improve the conductivity of the lithium battery cathode composite material 20. The carbon particles 206 can improve the conductivity of the lithium iron phosphate layer 204, and further improve the conductivity of the lithium battery cathode composite material 20.

In yet another example, each of the lithium iron particle 2042 can further include a carbon layer 2046 disposed on an outer surface of the lithium iron particle 2042. The carbon layer 2046 can improve the conductivity of lithium iron phosphate layer 204, and further improve the conductivity of the lithium battery cathode composite material 20.

A lithium battery cathode composite material according to a third embodiment is disclosed. The lithium battery cathode composite material has the same structure as the lithium battery cathode composite material 10 disclosed in the first embodiment except for certain characteristics of the lithium iron phosphate layer.

Figure 4:
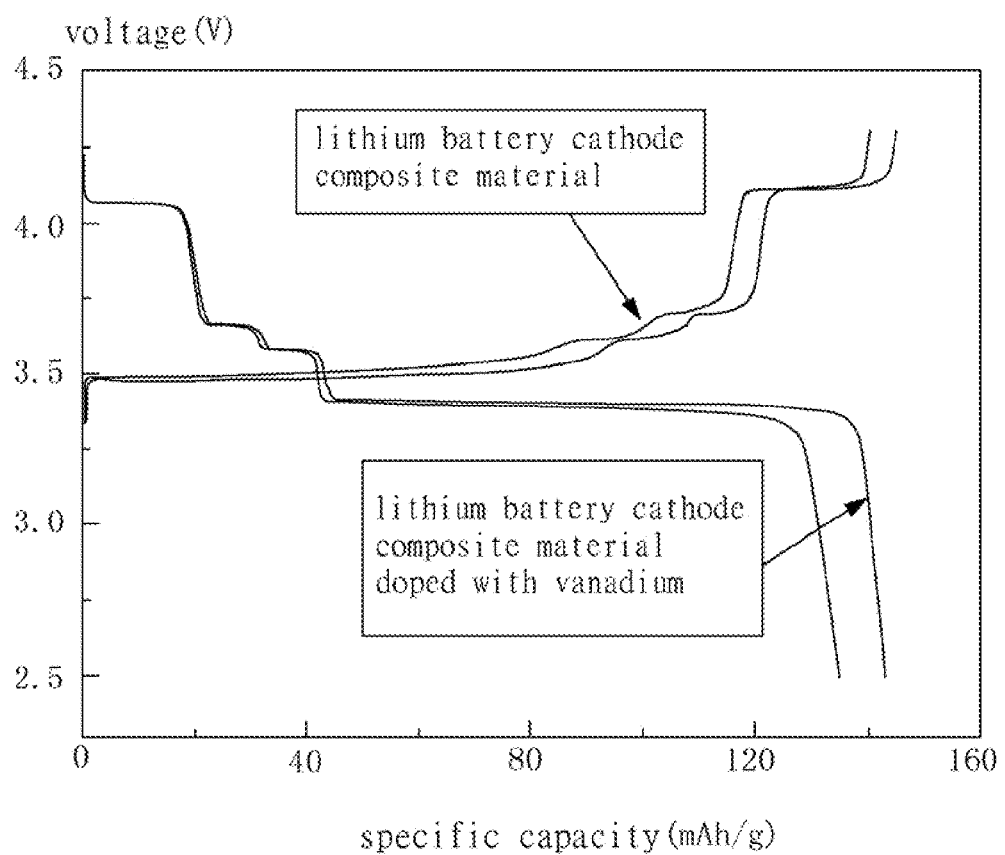
FIG. 4 is a test graph showing charge/discharge specific capacities at 0.1 Coulomb (C) rates of the lithium battery cathode composite material according to the first embodiment and a lithium battery cathode composite material doped with vanadium according to a third embodiment.
Figure 5:
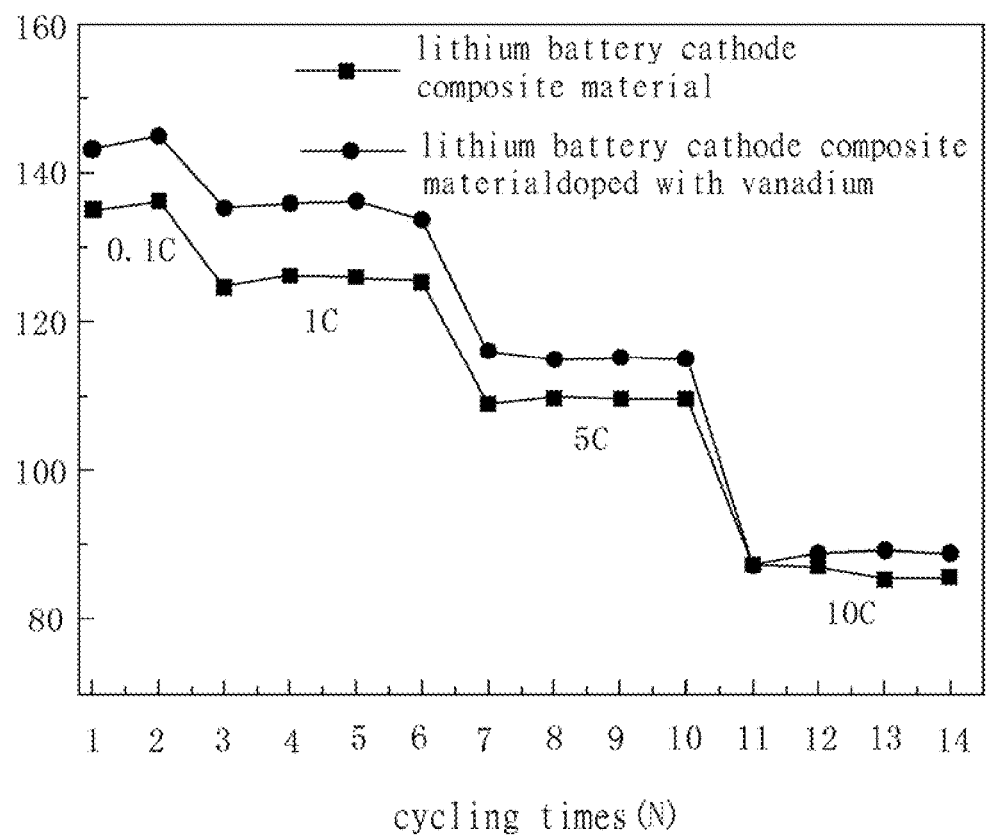
FIG. 5 is a test graph showing charge/discharge specific capacities at different rates of the lithium battery cathode composite material according to the first embodiment and the lithium battery cathode composite material doped with vanadium according to the third embodiment.

In the third embodiment, the lithium iron phosphate layer of the composite particle can be doped with different metal ions instead of iron ions ($Fe^{2+}$) in the lithium iron phosphate particles. The metal ions can be nickel ions ($Ni^{2+}$), cobalt ions ($Co^{3+}$), magnesium irons ($Mg^{2+}$), or vanadium ions ($V^{3+}$). The chemical formula of the lithium iron phosphate doped with the metal ions can be $LiFe_{(1-xy/2)}M_xPO_4$, wherein M is the metal doping material in the lithium iron phosphate, X is the number of M ions per one lithium iron phosphate molecule, Y is charge number of one M ion. X can be in a range from about 0.01 to about 0.08. Doping with the metal ions can decrease the chemical bonding force of Li—O in lithium iron phosphate, and the lithium ions can be dispersed easily in the electrolyte. As such, the rate capability and the cycling capability of the lithium battery cathode composite material 20 can be improved. In the third embodiment, the metal doping material in the lithium iron phosphate is vanadium, and the chemical formula of the lithium iron phosphate doped with the vanadium ions is $LiFe_{0.97}V_{0.03}PO_4$. FIG. 4 shows that, at the same rate, the charge/discharge specific capacity of the lithium battery cathode composite material according to the third embodiment is better than the lithium battery cathode composite material without doping. FIG. 5 shows that, at different rates, the charge/discharge specific capacity of the lithium battery cathode composite material according to the third embodiment is better than the lithium battery cathode composite material without doping.

A method for making a lithium battery cathode composite material according to one embodiment is provided. The method includes the following steps:

Step one, providing a plurality of lithium vanadium phosphate particles; and

Step two, forming a lithium iron phosphate layer on an outer surface of each lithium vanadium phosphate particle.

Step one includes the following substeps:

S1: providing a solution including a lithium source material, a vanadium material, a phosphate source material solution, and a solvent, wherein the lithium source material, the vanadium material, and the phosphate source material solution are dispersed in the solvent;

S2, dispersing a carbon source compound into the solution to form a sol mixture;

S3, spray drying the sol mixture to form a plurality of lithium vanadium precursor particles; and S4, heating the precursor particles, thereby forming a plurality of lithium vanadium phosphate particles.

In step S1, a mol ratio between lithium, vanadium, and phosphate can be about α:2:3, and α is in a range from 3 to 3.3. The vanadium in the solution is vanadium ions ($V^{5+}$). The lithium source material and the phosphate source material can be dissolved in water. The lithium source material can be lithium hydroxide or lithium salt. The lithium salt can be lithium carbonate, lithium sulfate, lithium nitrate, or lithium chlorinate. The phosphate source material can be phosphateic acid, ammonium di-hydrogen phosphate, or DAP. The vanadium source material can be ammonium metavanadate, vanadium pentoxide, hypovanadic oxide, or vanadium tetrachloride. The solvent can be water, ethanol, or acetone. The water can be deionized water or distilled water. In one embodiment, the lithium source material is lithium hydroxide, the vanadium source material is ammonium metavanadate, and the phosphate source material is phosphateic acid. The mol ratio between lithium, vanadium, and phosphate can be about 3:2:3. The solution can be stirred about 2 hours to ensure the lithium source, the vanadium source material, and the phosphate source material are uniformly dissolved in the solvent.

In step S2, the carbon source compound is organic material, which can undergo schizolysis to form carbon material, such as saccharose, dextrose, phenolic resin, polyacrylic acid, polyacrylonitrile, polyethyleneglycol, and polyvinylalcohol. The carbon source compound can be a reductive agent, and $V^{5+}$ in the solution is reduced to $V^{3+}$. A mol ratio between vanadium and carbon can be in a range from about 1:1 to about 1:1.3. In order to get a uniform sol mixture, before adding the carbon source compound or during dispersing the carbon source compound, the solution can be heated to a temperature of about 60° C. to about 85° C., resulting in partial evaporation of the solvent. In the heating process, the solution can be stirred using a magnetic agitating method, a ball milling method, or ultrasonic concussion.

In one embodiment, the carbon source compound is saccharose and the mol ratio in the sol mixture is about 1:1.2. The detail process of the step S2 includes:

heating the solution to about 80° C.;

maintaining the temperature and agitating the solution using the magnetic agitating method for about 2 hours until the solution becomes the sol mixture; and adding saccharose into the sol mixture and agitating the sol mixture until the saccharose is dissolved in the sol mixture.

In step S3, the sol mixture can be dried using a spray dry method. The spray dry method can be achieved using an airflow spray dryer. The spray dryer includes an atomizer and a peristaltic pump. The atomizer includes a two-fluid nozzle. The step S3 includes the following substeps of:

S3a, filling the sol mixture into the spray dryer using the peristaltic pump;

S3b, atomizing the sol mixture using the atomizer under a certain air pressure, thereby forming a plurality of vaporific liquid drops; and S3c, heating the liquid drops in hot air, thereby forming a plurality of lithium vanadium precursor particles.

In step s3b, the plurality of vaporific liquid drops has extremely small diameters. Accordingly, the liquid drops have large specific surface areas and rapid heat exchange can occur between the hot air and the vaporific liquid drops. Therefore, solvent in the liquid drops can be rapidly vaporized, thereby forming the lithium vanadium precursor particles. The lithium vanadium precursor particles are ball-shaped and porous. The diameters of the lithium vanadium precursor particles can be in a range from about 5 micrometers to about 20 micrometers. Each of the lithium vanadium precursor particles is a compound mixture of vanadium source material, lithium source material, carbon source compound, and phosphor source material.

Figure 7:
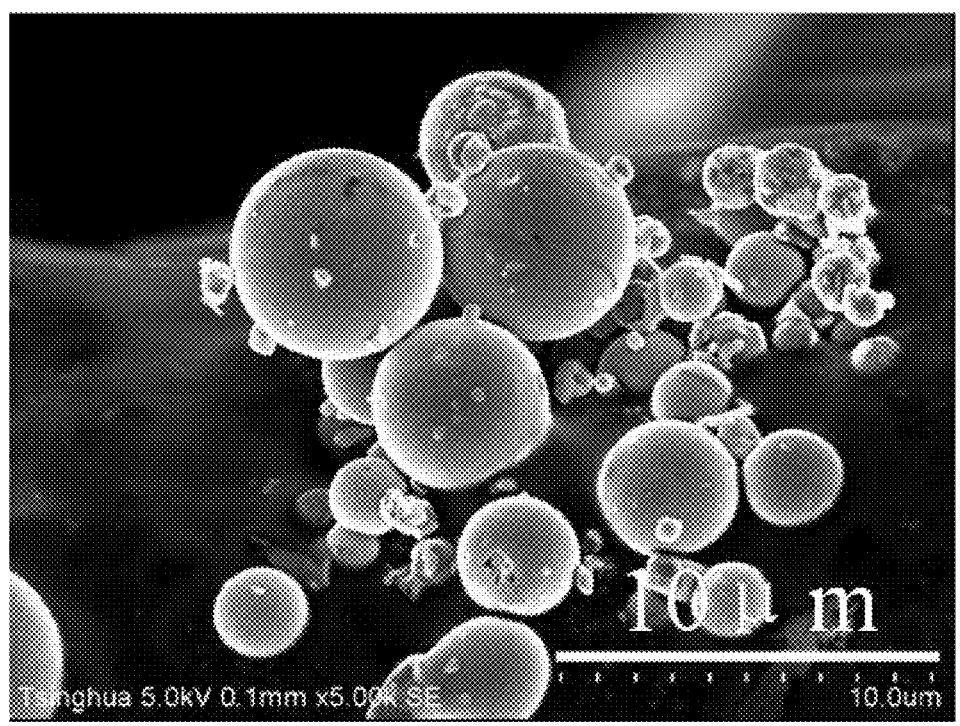
FIG. 7 is an SEM image of a lithium vanadium phosphate material according to one embodiment.

In step S4, the lithium vanadium phosphate precursor particles are heated in an inert gas from about 10 hours to about 20 hours at a temperature ranging from about 500 degrees Celsius to about 1000 degrees Celsius. In one embodiment, the heating temperature is about 800 degrees Celsius and the heating time is about 16 hours. After the heating process, the lithium vanadium precursor particles become lithium vanadium phosphate particles. In the heating process, the carbon source compound is pyrolyzed to form carbon, and $V^{5+}$ ions are reduced to $V^{3+}$ ions by carbon, and carbon is oxidized to carbon dioxide or carbon monoxide. As such, carbon may be present in the lithium vanadium phosphate particles. Referring to FIG. 7, the lithium vanadium particles are formed directly from the lithium vanadium precursor particles which are ball-shaped or almost ball-shaped, and the lithium vanadium phosphate particles are ball-shaped or almost ball-shaped.

The step two includes the following substeps of:

M1, providing a lithium iron phosphate precursor slurry;

M2, dispersing the lithium vanadium phosphate particles in the lithium iron phosphate precursor slurry, coating the outer surface of each lithium vanadium phosphate particle with the lithium iron phosphate precursor slurry to form a plurality of compound precursor particles, and then solidifying the compound precursor particles; and M3, heat treating the compound precursor particles to form a plurality of compound particles, thereby forming the lithium battery cathode composite material.

In step M1, a method for making the lithium iron phosphate precursor slurry can be a coprecipitation method or a sol-gel method. In one embodiment, the method for making the lithium iron phosphate precursor slurry includes steps of:

M1a, providing a solution including a solvent, an iron salt material, and a phosphate material;

M1b, providing a reactor, adding the solution and a plurality of micro particles into the reactor, and adding an alkaline solution into the solution until a pH value of the solution ranges from about 1.5 to 5, and stirring the solution to form a plurality of iron phosphate precursor particles, wherein the plurality of iron phosphate precursor particles is disposed in the solution to form a liquid mixture; and M1c, adding a lithium source solution and a reducing agent into the liquid mixture to form a lithium iron phosphate precursor slurry.

In step M1a, a ratio between the iron and the phosphate can be in a range from about 1:0.8 to about 1:1.2. The iron salt and the phosphate source material can be both dissolved in the solvent to form a solution. The iron salt can be iron chloride, iron nitrate, or iron sulfate. The phosphate source material can be phosphateic acid, ammonium hydrogen phosphate, or ammonium di-hydrogen phosphate. The phosphate source material is dissolved in the solvent to form a plurality of phosphate anions $(PO_4)^{3-}$. The solvent can be water, ethanol, or acetone. The water can be deionized water or distilled water. In the liquid mixture, a mol ratio of the iron salt is in a range from about 0.1 mol/L to about 3 mol/L, and a mol ratio of the phosphate source material is in a range from about 0.1 mol/L to about 3 mol/L. In one embodiment, the iron salt is iron nitrate, the phosphate source material is phosphateic acid, and the mol ratio of the iron nitrate and the phosphateic acid are both 0.2 mol/L.

In the step M1b, the plurality of micro particles is made of rigid material that is not dissolved in the solvent. The micro particles do not react with the iron salt and the phosphate source material. The material of the micro particles can be ceramic, quartz, or glass. The diameters of the micro particles can be in a range from about 20 micrometers to about 1 millimeter. A volume percentage of the micro particles in the solution can be in a range from about 15% to about 50%.

In the step M1b, the solution can be transported continuously in the reactor at a flow rate of about 100 ml/hour to about 150 ml/hour. In one embodiment, the flow rate is about 120 ml/hour. The solution can be added in the reactor from a bottom part of the reactor. A solvent material can be added into the reactor before the solution is added in the reactor. The solvent material can be the same as the solvent in the solution. In one embodiment, the solvent material is deionized water and a volume ratio of the solvent material in the reactor is about 60%.

In the step M1b, the micro particles can be added in the reactor before the solution is transported or during transportation of the solution into the reactor. The solution and the micro particles can be agitated using magnetic agitation, ball milling, or ultrasonic concussion. In one embodiment, the solution and the micro particles are magnetically agitated, the power of the magnetic agitator can be in a range from about 50 W/L to about 60 W/L.

In the step M1b, the alkaline solution can be ammonia water or sodium hydroxide. In one embodiment, the pH value of the solution after the alkaline solution has been added is about 2.3. The iron salt reacts with the phosphate source material to form a plurality of iron phosphate hydrate particles. Because the solution is added into the reactor continuously, the iron phosphate hydrate particles overflow from the reactor continuously. Iron phosphate hydrate particles can be collected from the overflowing materials.

In step M1b, during the stirring process, the micro particles are used as stirrers to enhance reaction between the iron salt and the phosphate source material. The micro particles can also be used to control diameters of the iron phosphate precursor particles, and preventing the iron phosphate precursor particles from clumping together during formation. The micro particles can be omitted in the step.

Other parameters can be used to control diameters of the iron phosphate hydrate particles, such as the temperature of the reactor, flow speed of the solution, and reaction time between the iron salt and the phosphate source material. The temperature of the reactor can be in a range from about 25° C. to about 50° C. The reaction time can be in a range from about 40 minutes to about 2 hours. The reaction time can be controlled by changing the flow velocity of the solution. The higher the temperature, the larger the diameters of the iron phosphate particles. The longer the reaction time, the larger the diameters of the iron phosphate precursor particles. In one embodiment, the temperature of the reactor is about 25° C. and the reaction time is about 1 hour.

The step M1b can further include the step of washing the iron phosphate hydrate particles. The overflowing materials collected are washed using a centrifugation method. The iron phosphate precursor particles are dried at a temperature of about 70° C. to about 100° C. for about 2 hours to about 4 hours. The diameters of the iron phosphate hydrate particles are in a range from about 20 nanometers to about 10 micrometers. The diameters of the iron phosphate hydrate particles are smaller than the micro particles. The iron phosphate hydrate particles and the micro particles can be separated by filtering.

Figure 8:
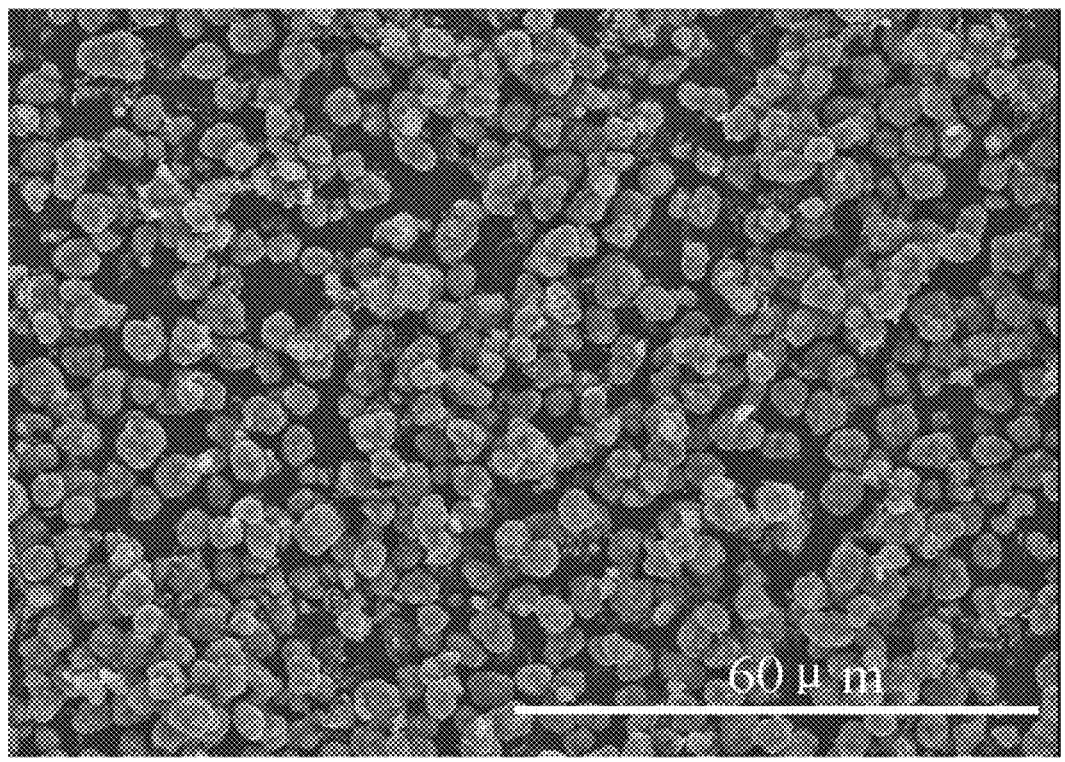
FIG. 8 is an SEM image of lithium iron phosphate precursor particles according to one embodiment.
Figure 9:
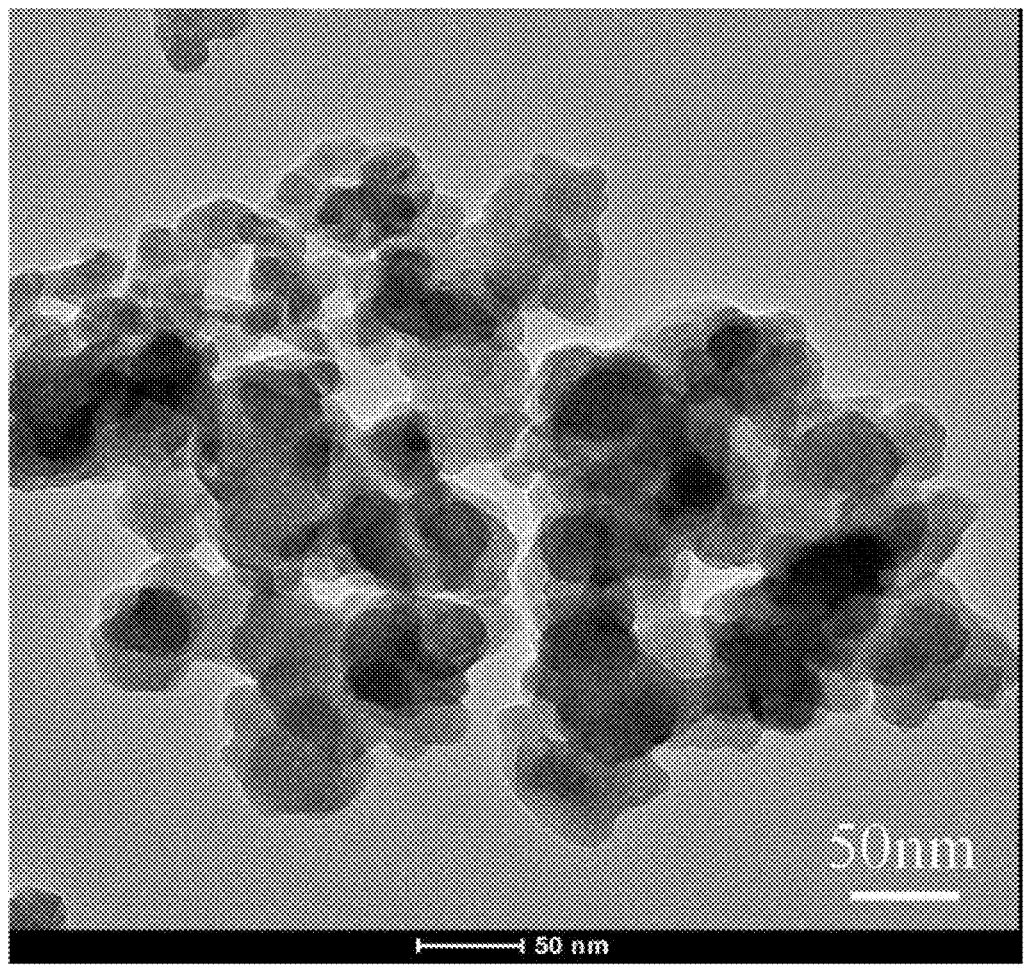
FIG. 9 is a Transmission Electron Microscope (TEM) image of lithium iron phosphate precursor particles according to one embodiment.
Figure 10:
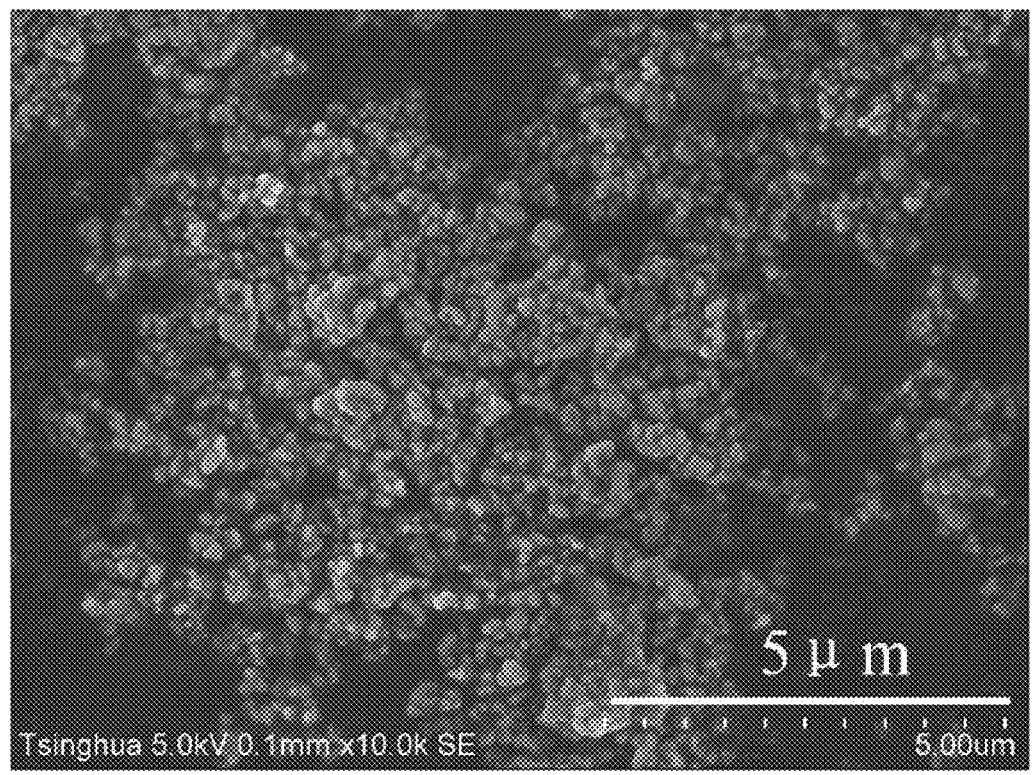
FIG. 10 is an SEM image of lithium iron phosphate particles according to one embodiment.

Referring to FIGS. 8 and 9, the diameters of the iron phosphate hydrate particles can be in a range from about 20 nanometers to about 10 micrometers. The shapes of the iron phosphate hydrate particles can be ball-shaped or almost ball-shaped. In one embodiment, the diameters of the iron phosphate hydrate particles are in a range from about 100 nanometers to about 200 nanometers. Characteristics such as the diameters and dispersivity of the iron phosphate hydrate particles determine the characteristics of the lithium battery cathode composite material.

The iron phosphate hydrate particles can be further heated to a temperature of about 400° C. to about 700° C. in a protective gas atmosphere to remove the crystal water in the iron phosphate hydrate particles, thereby forming iron phosphate precursor particles without crystal water. The protective gas can be inert gases or nitrogen. The temperature is maintained for about 2 hours to about 24 hours. In one embodiment, the iron phosphate hydrate particles are heated to about 520° C. for about 10 hours to remove crystal water to form the iron phosphate precursor particles.

In the step M1c, the lithium source material can be lithium hydroxide or lithium salt. The lithium salt can be lithium carbonate, lithium sulfate, lithium nitrate, or lithium chlorination. The solvent can be water, ethanol, or acetone. The water can be deionized water or distilled water. The reducing agent can be a carbon source compound, which is an organic material and can undergo schizolysis to form carbon material, such as saccharose, dextrose, phenolic resin, polyacrylic acid, polyacrylonitrile, polyethyleneglycol, and polyvinylalcohol. A mol ratio between lithium in the lithium source material, phosphate in the iron phosphate precursor particles, and carbon in the carbon compound material can be in a range from about 1:1:1 to about 1.2:1:1.3. In one embodiment, the lithium source material is lithium hydroxide, and the reducing agent is saccharose.

In the step M1c, after the lithium source material and the reducing agent are added in the liquid mixture, the liquid mixture can be agitated by a magnetic agitating method, ball milling method, or ultrasonic concussion. In one embodiment, the liquid mixture is agitated by the ball milling method for about 2 hours.

In the step M1c, the lithium iron phosphate precursor slurry is a mixture including iron phosphate precursor particles, lithium source material, and reducing agent.

In the step M1, in another embodiment, after the lithium iron phosphate precursor slurry is formed, the lithium iron phosphate precursor slurry can be dried and then heat-treated at a temperature in a range from about 500° C. to about 850° for about 8 hours to about 40 hours to form a plurality of lithium iron phosphate particles. In this process, the reducing agent undergoes schizolysis to form carbon material, and the $Fe^{3-}$ ions in the iron phosphate precursor particles are reduced to $Fe^{2+}$ ions by the carbon material. The $Fe^{2+}$ ions react with the lithium source material to form lithium iron phosphate material, a plurality of lithium iron phosphate particles. The carbon material can control diameters of the lithium iron phosphate particles and prevent the lithium iron phosphate particles from clumping together. The lithium iron phosphate particles made by the method in this embodiment can be used as a cathode material in a lithium battery separately.

The step M2 further includes substeps of:

M2a, dividing the lithium iron phosphate precursor slurry into a first part, a second part, and a third part;

M2b, dispersing the lithium vanadium phosphate particles in the first part, to coat the surface of each of the lithium vanadium phosphate particles with the first part;

M2c, separating the coated lithium vanadium phosphate particles from the first part, and drying the coated lithium vanadium phosphate particles to form a plurality of first compound particles;

M2d, dispersing the first compound particles in the second part, and repeating steps M2b and M2c to form a plurality of second compound particles;

M2e, dispersing the second compound particles in the third part, and repeating steps M2b and M2c to form a plurality of compound precursor particles.

In the step M2b, the lithium vanadium phosphate particles and the first part lithium iron phosphate precursor slurry are agitated to ensure uniform coating of each of the lithium vanadium phosphate particles.

In the step M2b, a water-soluble adhesive can be added into the lithium iron phosphate precursor slurry. The lithium iron phosphate precursor slurry with the water-soluble adhesive can tightly combine with the lithium vanadium phosphate particles.

In the step M2c, the lithium vanadium phosphate particles coated with the lithium iron phosphate precursor slurry are dried at a temperature in a range from about 60° C. to about 90° C. for about 10 minutes to about 30 minutes.

In the step M2e, each compound precursor particle includes a lithium vanadium phosphate particle and a lithium iron phosphate precursor layer. The lithium iron phosphate precursor layer includes iron phosphate precursor particles, lithium source material, and reducing agent. A weight ratio between the iron phosphate precursor particles and the lithium vanadium phosphate particles in the compound precursor particles can be in a range from about 5.5:4 to about 6.5:4.

In the step M3, the compound precursor particles are heat-treated at a temperature in a range from about 500° C. to about 850° for about 8 hours to about 40 hours. In this process, the reducing agent undergoes schizolysis to form carbon material, and the $Fe^{3+}$ ions in the iron phosphate precursor particles are reduced to $Fe^{2+}$ ions by the carbon material. The $Fe^{2+}$ ions react with the lithium source material to form lithium iron phosphate material, and as such a plurality of lithium iron phosphate particles is formed, whereby the compound precursor particles become compound particles. Each of the compound particles includes a lithium vanadium phosphate particle and a lithium iron phosphate layer disposed on the surface of the lithium vanadium phosphate particle. The lithium iron phosphate layer includes a plurality of lithium iron phosphate particles. The carbon material can control the diameters of the lithium iron phosphate particles and prevent the lithium iron phosphate particles from clumping together. The carbon material disposed on surfaces of the lithium iron phosphate particles can improve the conductivity of the lithium iron phosphate particles.

The lithium battery cathode composite material formed by this method has a core-shell structure, because the "shell" (lithium iron phosphate layer) has a large specific surface area, the shell has a large contact area with an electrolyte when the lithium battery cathode composite material is used in a battery, and the lithium iron phosphate particles can be dispersed easily and quickly in the electrolyte. The method for making the lithium battery cathode composite material is an oxido-reduction method which is simple and has a short cycle. The reducing agent is carbon compound material, which is relatively cheap, thus the method is low-cost.

Figure 11:
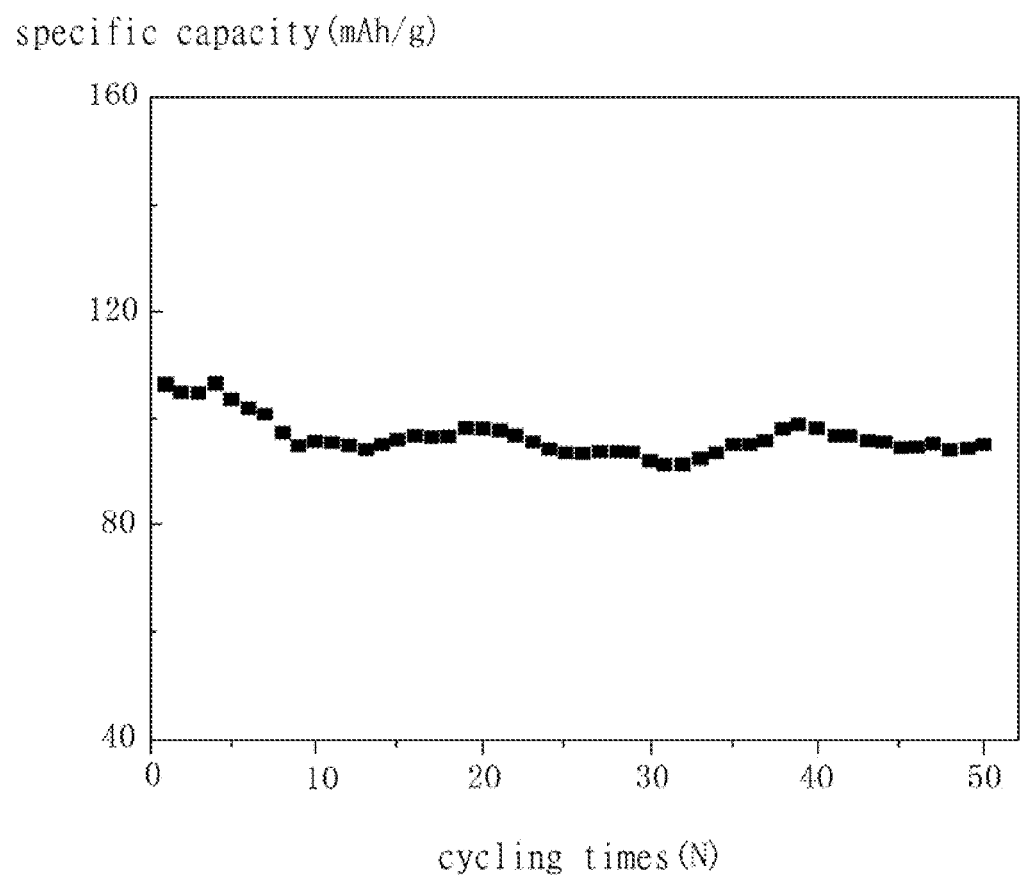
FIG. 11 is a test graph showing the relationship between specific capacity and cycling capability at 0.1 C rate of the lithium battery cathode composite material according to another embodiment.
Figure 12:
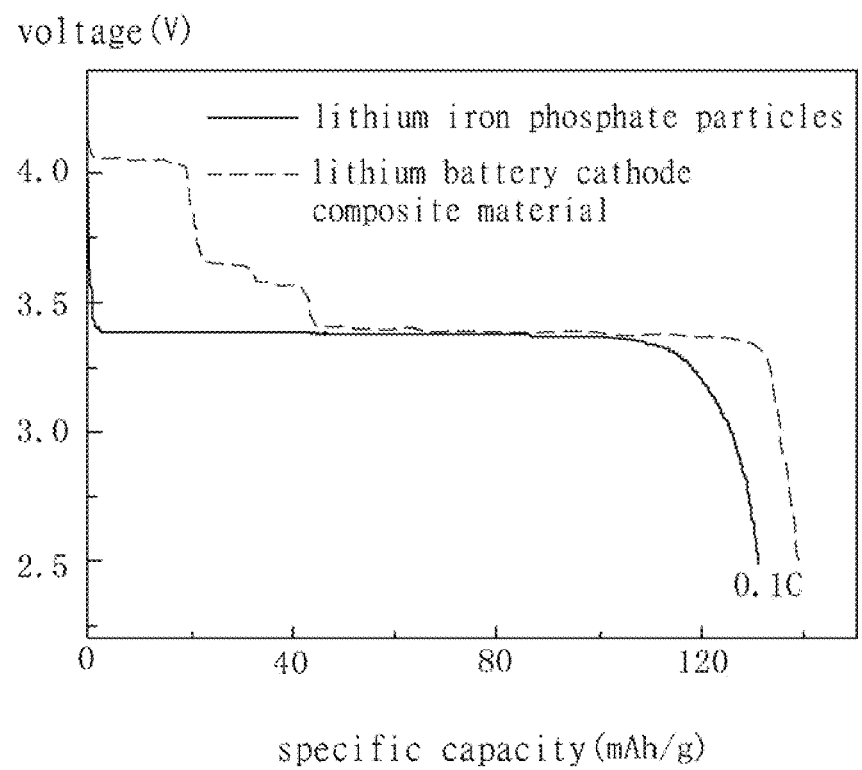
FIG. 12 is a chart comparing discharging specific capacity at 0.1 C between the lithium iron phosphate particles in FIG. 10 and the lithium battery cathode composite material according to one embodiment.
Figure 13:
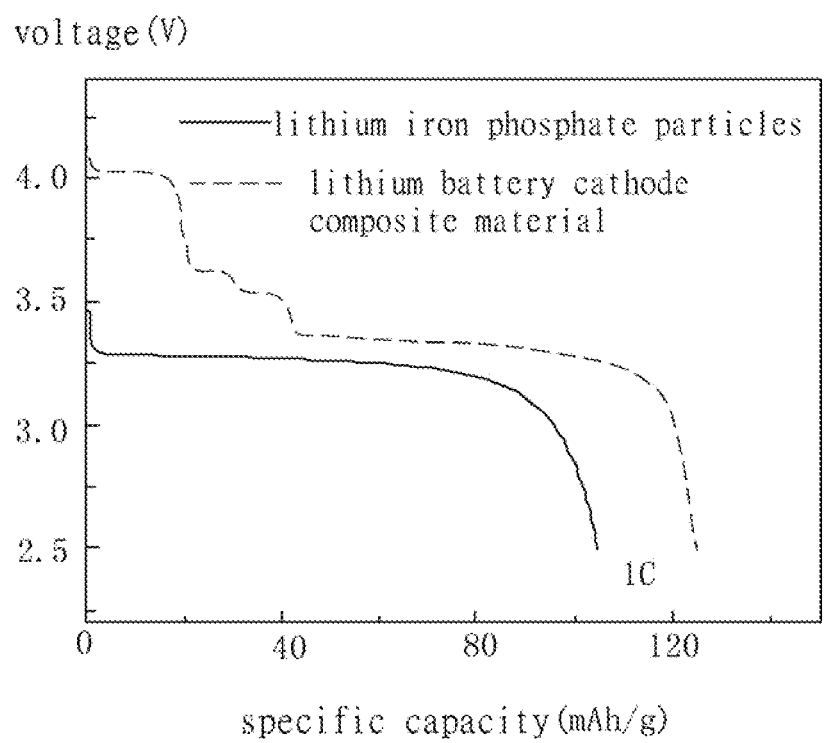
FIG. 13 is a chart comparing discharging specific capacity at 1 C between the lithium iron phosphate particles in FIG. 10 and the lithium battery cathode composite material in FIG. 12.
Figure 14:
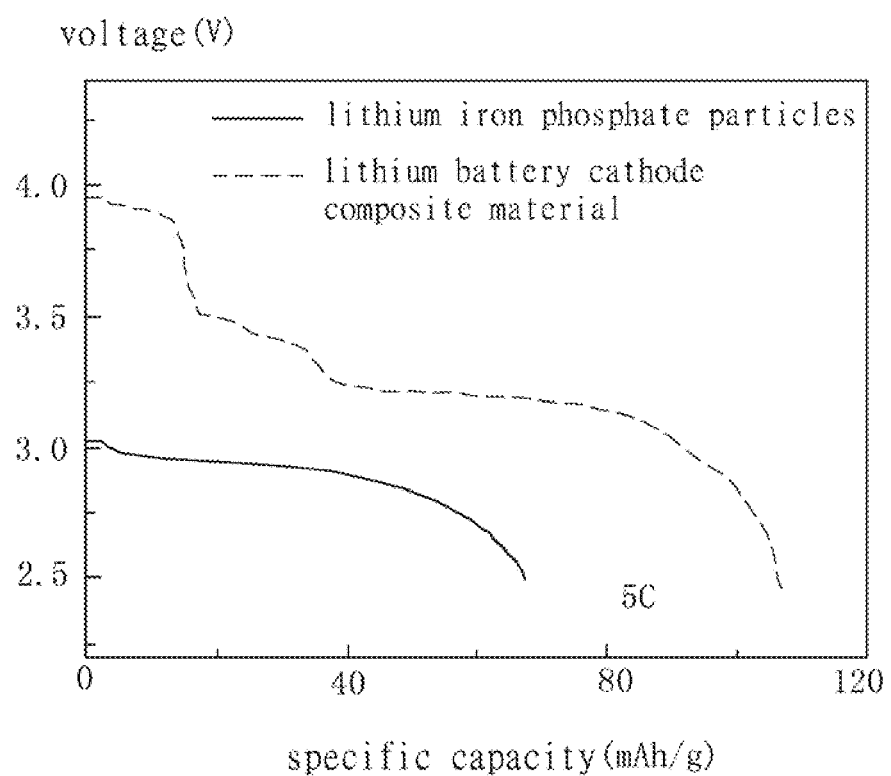
FIG. 14 is a chart comparing discharging specific capacity at 5 C between the lithium iron phosphate particles in FIG. 10 and the lithium battery cathode composite material in FIG. 12.
Figure 15:
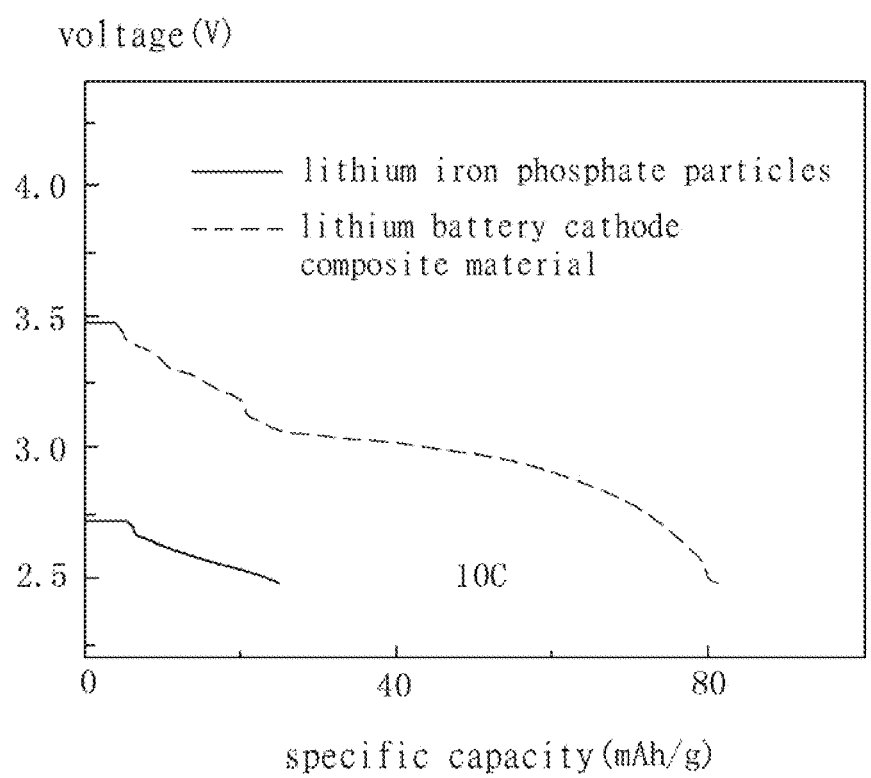
FIG. 15 is a chart comparing discharging specific capacity at 10 C between the lithium iron phosphate particles in FIG. 10 and the lithium battery cathode composite material in FIG. 12.

The lithium iron phosphate particles disposed on the surfaces of the lithium vanadium phosphate particles can be used as the electrode material of a lithium battery separately. Referring to FIG. 11, at a 1 Coulomb (C) rate, the lithium iron phosphate particles made by this method, which have diameters of about 100 nanometers to about 200 nanometers, have a specific capacity of about 106.4 mAh/g in the first cycle, and the specific capacity of the lithium battery cathode composite material is decreased about 95 mAh/g at the fiftieth cycle, which is down about 10% from the first cycle. Thus, the lithium iron phosphate particles having small diameters have good cycling capability. Referring to FIGS. 12-15, at a voltage of about 2.5V to about 4.3V, the lithium battery cathode composite material made by the present method has a higher specific capacity than the lithium iron phosphate particles at different rates. FIGS. 12-15 shows that the lithium battery cathode composite material having core-shell structures have better characteristics than just lithium iron phosphate particles, because the lithium iron phosphate particles in the lithium battery cathode composite material is essentially a "shell" having a large specific surface area, and the lithium iron phosphate particles 1042 can be dispersed easily and quickly in the electrolyte.

A method for making a lithium battery cathode composite material doped with vanadium ions is provided. The method includes the following steps:

Step I, providing a plurality of lithium vanadium phosphate particles; and

Step II, forming a lithium iron phosphate layer doped with vanadium ions on an outer surface of each lithium vanadium phosphate particle.

In step I, the detailed process of providing the plurality of lithium vanadium phosphate particles is the same as step one of the method for making a lithium battery cathode composite material.

Step II includes the following substeps of:

N1, providing a slurry of lithium iron phosphate precursor doped with vanadium ions;

N2, dispersing the lithium vanadium phosphate particles in the lithium iron phosphate precursor slurry, to coat the outer surface of each lithium vanadium phosphate particle to form a plurality of compound precursor particles, and then solidifying the compound precursor particles; and N3, heat treating the compound precursor particles to form a plurality of compound particles doped with vanadium, thereby forming the lithium battery cathode composite material doped with vanadium.

In step N1, a method for making the slurry of lithium iron phosphate precursor doped with vanadium includes steps of:

N1a, providing a solution including a solvent, a vanadium source material, an iron salt material, and a phosphate material;

N1b, providing a reactor, adding the solution and a plurality of micro particles into the reactor, adding an alkaline solution in the solution until the solution has a pH value ranging from about 1.5 to 5, and stirring the solution to form a plurality of iron phosphate precursor particles, wherein the plurality of iron phosphate precursor particles is disposed in the solution to form a liquid mixture; and N1c, adding a lithium source solution and a reducing agent into the liquid mixture to form a slurry of lithium iron phosphate precursor doped with vanadium.

In step N1a, a mol ratio between the mol sum of vanadium, iron, and the phosphate can be in a range from about 1:0.8 to about 1:1.2. Other characteristics of step N1a are the same as those disclosed in the step M1a above.

In step N1b, the iron salt reacts with the phosphate source material and vanadium source material to form a plurality of iron phosphate hydrate particles doped with vanadium. The detailed process is the same as the step M1b disclosed herein.

Figure 16:
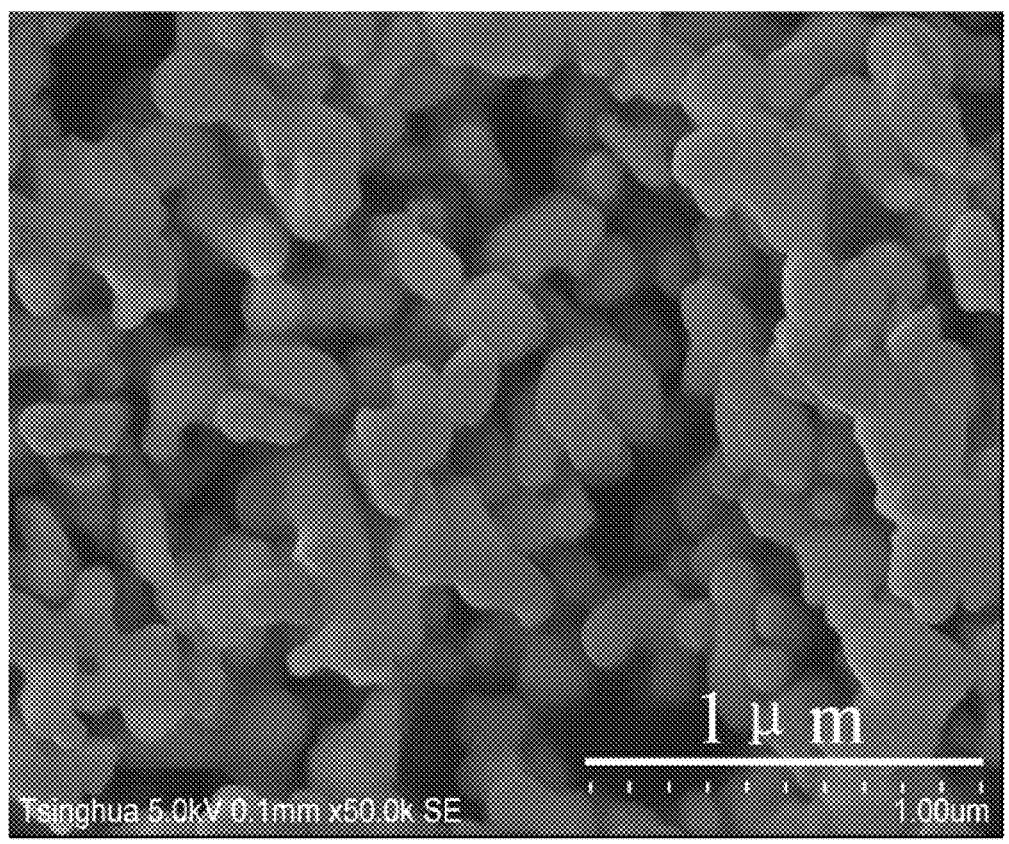
FIG. 16 is an SEM image of lithium iron phosphate precursor particles without vanadium doping according to one embodiment.
Figure 17:
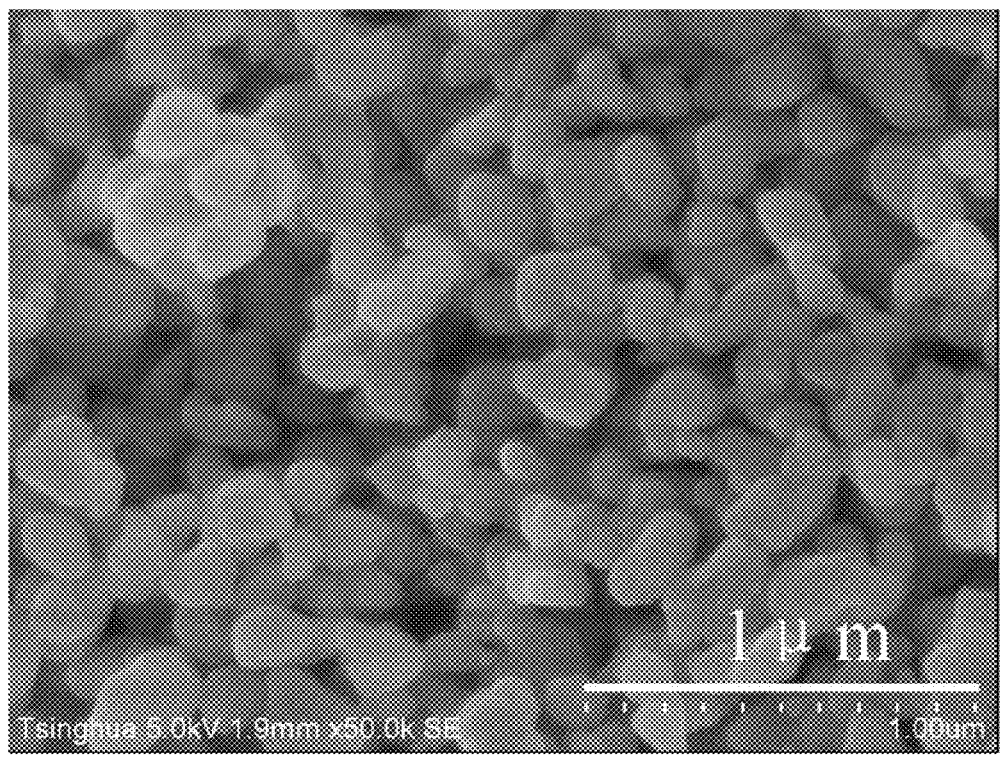
FIG. 17 is an SEM image of lithium iron phosphate precursor particles doped with vanadium according to another embodiment.

In step N1c, the detailed process is the same as the step M1c disclosed herein. In the step N1c, the slurry of lithium iron phosphate precursor doped with vanadium is a mixture including iron hydrate particles doped with vanadium, lithium source material, and reducing agent. Referring to FIGS. 16 and 17, the iron phosphate hydrate particles doped with vanadium have smaller diameters and better dispersivity than the iron phosphate hydrate particles without vanadium.

Figure 18:
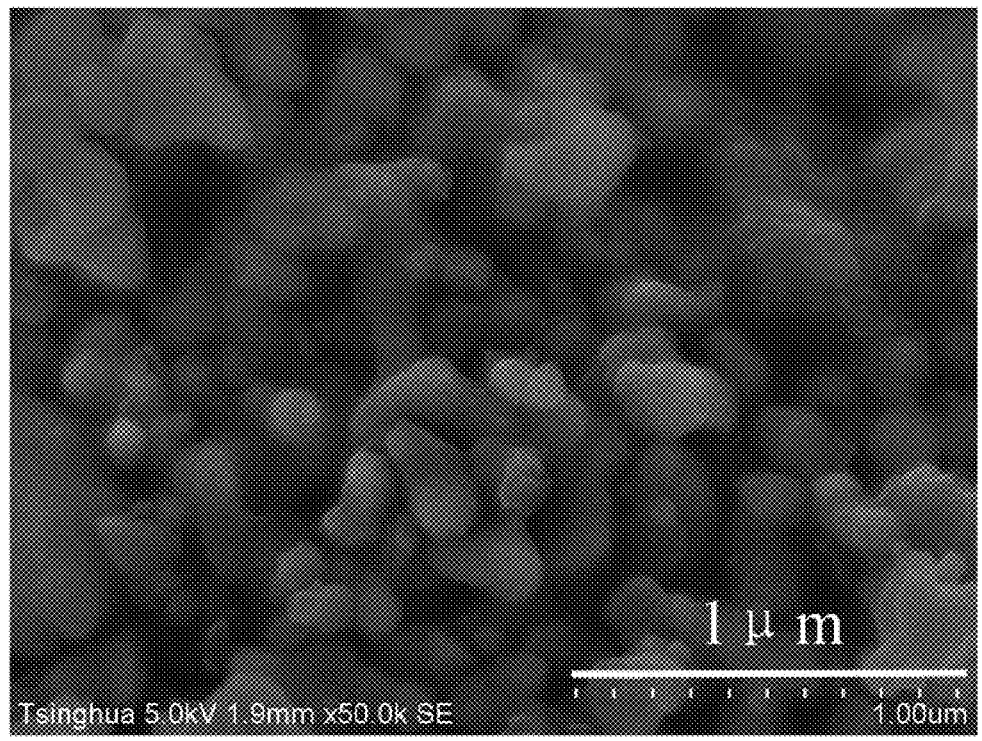
FIG. 18 is an SEM image of lithium iron phosphate particles doped with vanadium according to yet another embodiment.
Figure 19:
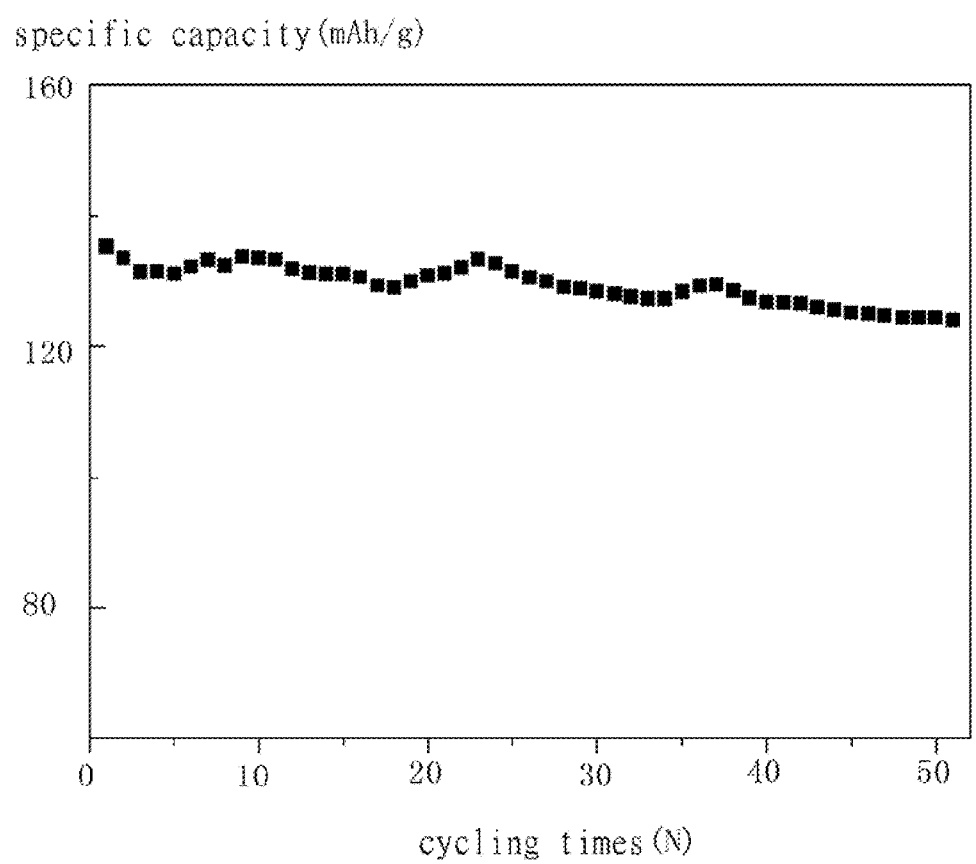
FIG. 19 is s a test graph showing the relationship between specific capacity and cycling capability at 1 C rate of the lithium iron phosphate particles doped with Vanadium according to another embodiment.

In the step N1, after the slurry of lithium iron phosphate precursor doped with vanadium is formed, the slurry of lithium iron phosphate precursor doped with vanadium can be dried and then heat-treated at a temperature in a range from about 500° C. to about 850° for about 8 hours to about 40 hours to form a plurality of lithium iron phosphate particles doped with vanadium. In this process, the reducing agent undergoes schizolysis to form carbon material, the $Fe^{3+}$ ions in the iron phosphate precursor particles are reduced to $Fe^{2+}$ ions by the carbon material, and the $V^{5+}$ ions are reduced to $V^{3+}$. The $Fe^{2+}$ ions and the $V^{3+}$ ions react with the lithium source material to form lithium iron phosphate material doped with vanadium, and as such, a plurality of lithium iron phosphate particles doped with vanadium is formed. In the present embodiment, the chemical formula of the lithium iron phosphate particles doped with vanadium is $LiFe_{0.97}V_{0.03}PO_4$. The carbon material can control diameters of the lithium iron phosphate particles doped with vanadium and prevent the lithium iron phosphate particles doped with vanadium from clumping together. Referring to FIG. 18, lithium iron phosphate particles doped with vanadium are ball-shaped or almost ball-shaped and have small diameters. The lithium iron phosphate particles doped with vanadium can be used as cathode material in a lithium battery separately. Referring to FIG. 19, at a voltage of about 2.5V to about 4.2V and at a 1 C rate, the lithium iron phosphate particles doped with vanadium ($LiFe_{0.97}V_{0.03}PO_4$) has a specific capacity of about 135.3 mAh/g at the first cycle, and a specific capacity of about 124.4 mAh/G after 50 cycles. Therefore the lithium iron phosphate particles doped with vanadium have a high specific capacity and good cycling capacity.

In step N2, the detailed process is the same as the step M2 disclosed herein.

Figure 20:
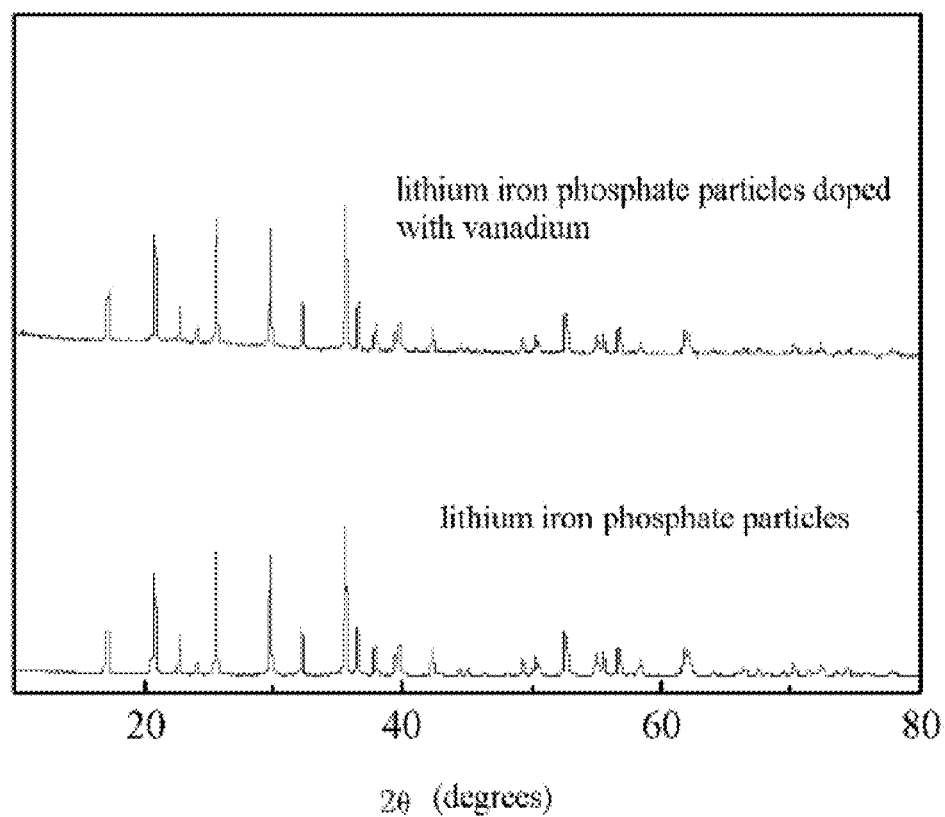
FIG. 20 is a chart comparing X-ray diffraction patterns between the lithium iron phosphate particles in FIG. 16 and lithium iron materials doped with vanadium.
Figure 21:
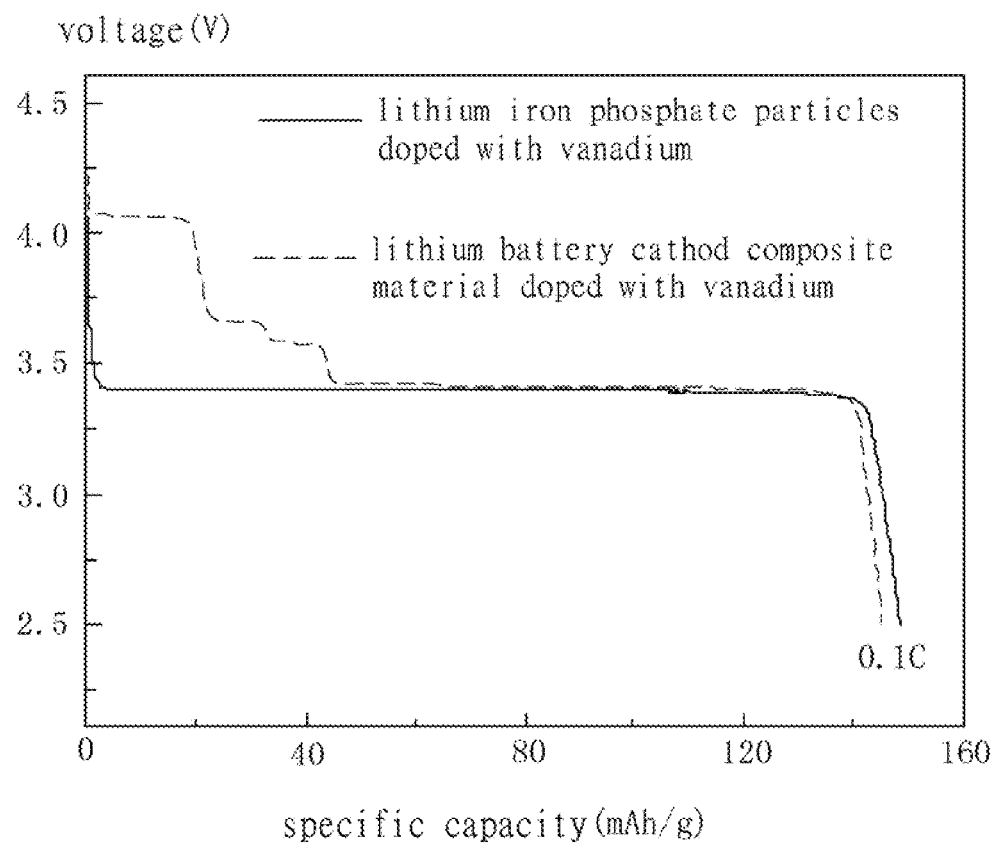
FIG. 21 is a chart comparing discharging specific capacity at 0.1 C between lithium iron phosphate particles doped with vanadium and lithium battery cathode composite material doped with vanadium according to one embodiment.
Figure 22:
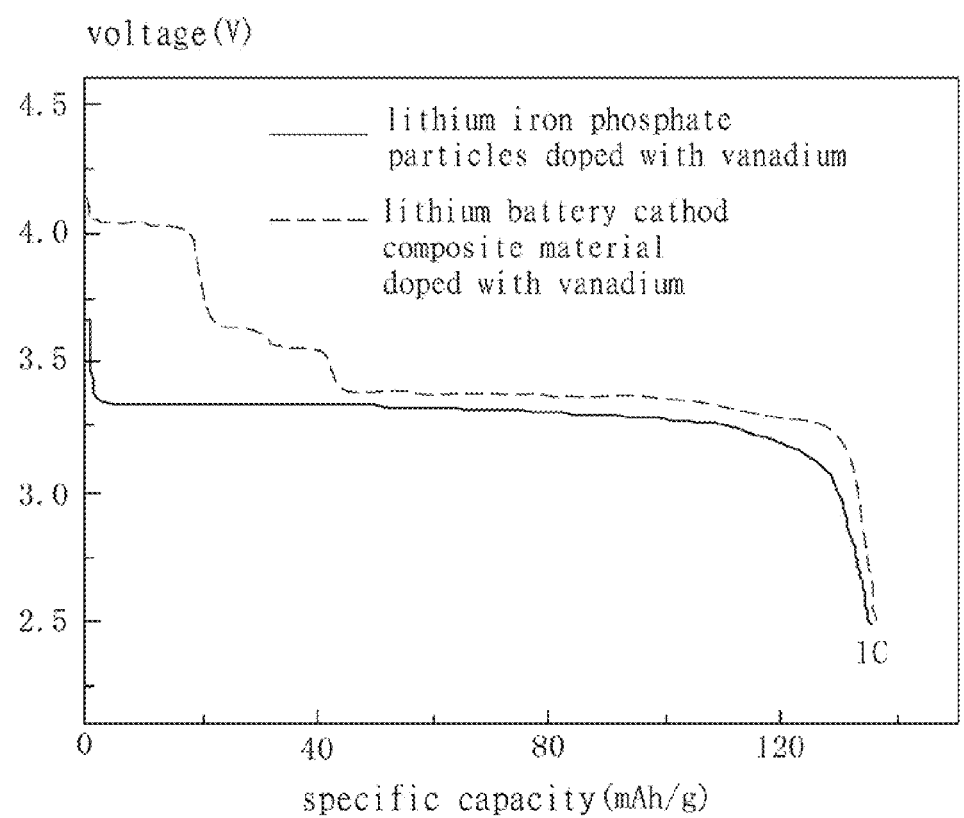
FIG. 22 is a chart comparing discharging specific capacity at 1 C between lithium iron phosphate particles doped with vanadium and lithium battery cathode composite material doped with vanadium in FIG. 19.
Figure 23:
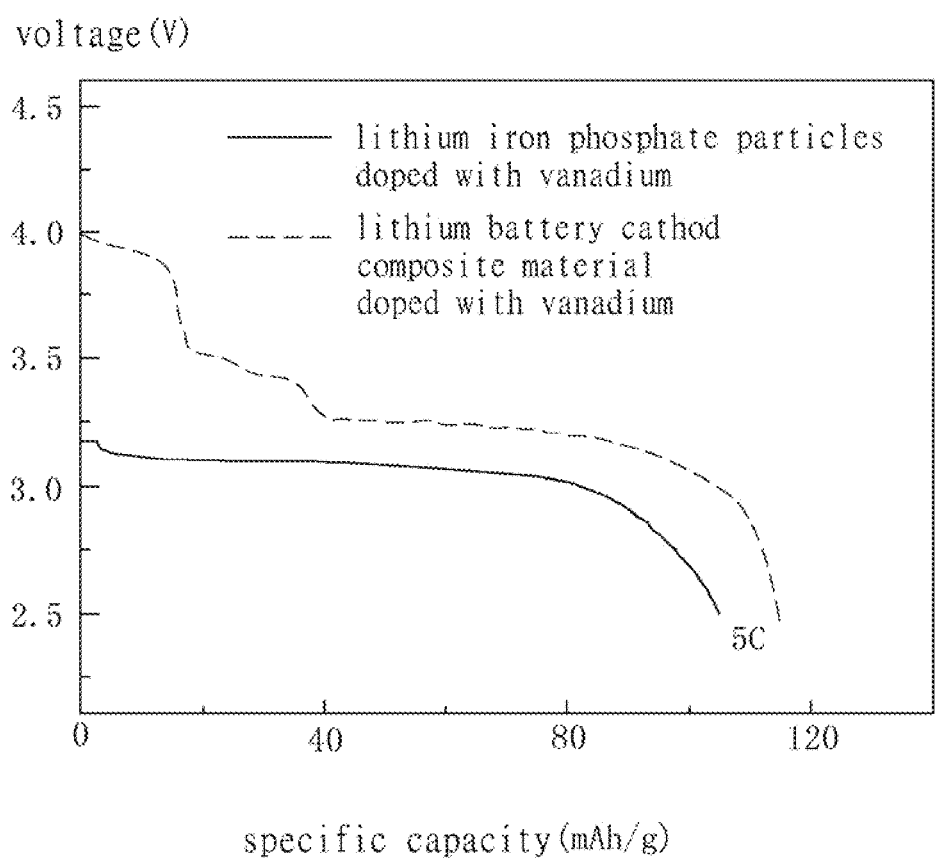
FIG. 23 is a chart comparing discharging specific capacity at 5 C between lithium iron phosphate particles doped with vanadium and lithium battery cathode composite material doped with vanadium in FIG. 19.
Figure 24:
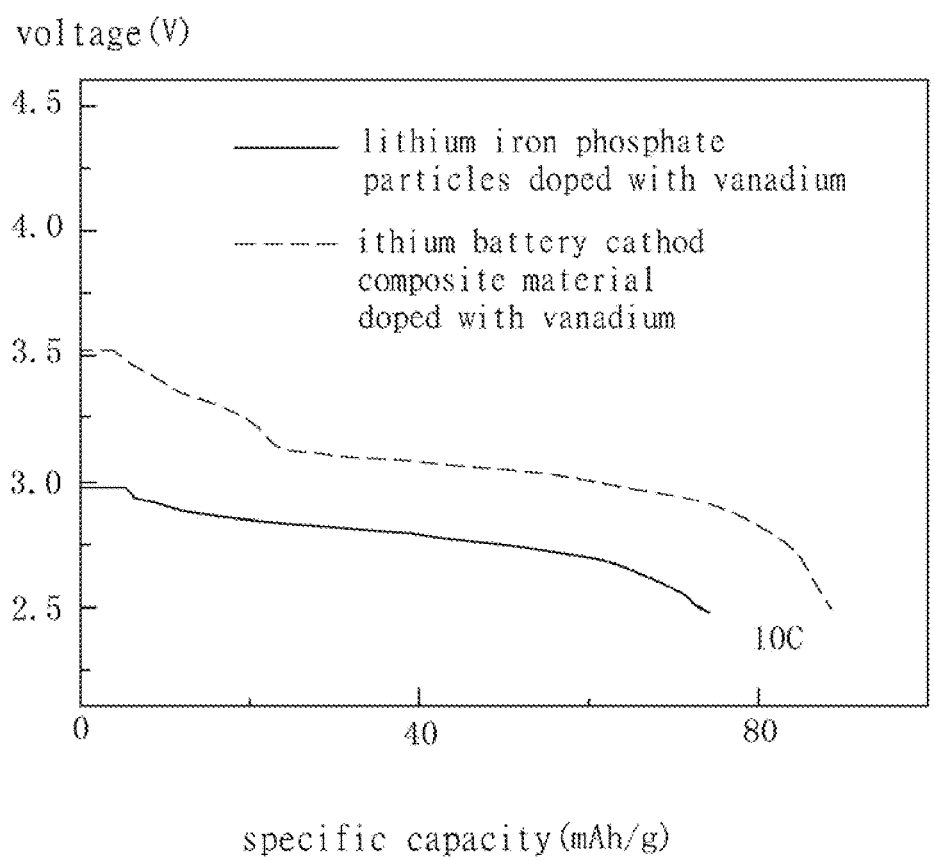
FIG. 24 is a chart comparing discharging specific capacity at 10 C between lithium iron phosphate particles doped with vanadium and lithium battery cathode composite material doped with vanadium in FIG. 19.

In step N3, the detailed process is the same as the step M3 disclosed herein. In step N3, each of the compound particles doped with vanadium includes a lithium vanadium phosphate particle and a lithium iron phosphate disposed on the surface of the lithium vanadium phosphate particle. The lithium iron phosphate layer includes a plurality of lithium iron phosphate particles doped with vanadium. Each of the lithium iron phosphate particles is doped with vanadium. Referring to FIG. 20, the comparison of X-ray diffraction patterns between the lithium iron phosphate particles and lithium iron phosphate particles doped with vanadium shows that the two X-ray diffraction patterns are almost the same, which proves that vanadium in the lithium iron phosphate particles exists as vanadium ions instead of iron ions in the lithium iron phosphate particles, and there are no impurities brought by the vanadium in the lithium iron phosphate particles doped with vanadium.

The lithium iron phosphate particles doped with vanadium disclosed above can be used as an electrode material separately. Referring to FIGS. 21-24, at a voltage of about 2.5V to about 4.3V, the lithium iron phosphate particles doped with vanadium have specific capacities of 148.6 mAh/g at 0.1 C rate, 135.3 mAh/g at 1 C rate, 105.0 mAh/g at 5 C rate, and 74.3 mAh/g at 10 C rate. At a voltage of about 2.5V to about 4.3V, the lithium battery cathode composite material doped with vanadium has specific capacities of 145.0 mAh/g at 0.1 C rate, 136.2 mAh/g at 1 C rate, 115.0 mAh/g at 5 C rate, and 89.0 mAh/g at 10 C rate. FIGS. 21-24 show that the lithium battery cathode composite material doped with vanadium has almost the same specific capacity as the lithium iron phosphate particles doped with vanadium at lower rates (0.1 C and 1 C), but has higher specific capacity than the lithium iron phosphate particles doped with vanadium at higher rates (5 C and 10 C).

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the invention but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain What claimed is:

1. A method for making a lithium battery cathode material, the method comprising:
providing a mixed solution including a solvent, an iron salt material, a vanadium source material, and a phosphate material;
adding an alkaline solution in the mixed solution until the mixed solution has a pH value ranging from about 1.5 to 5 and adding a plurality of micro particles in the mixed solution;
stirring the mixed solution to react the iron salt and the vanadium source material with the phosphate material to form a plurality of precursor particles of iron phosphate doped with vanadium, wherein the stirring the mixed solution comprises maintaining the plurality of micro particles in the mixed solution during reacting the iron salt and the vanadium source material with the phosphate material;
providing a lithium source solution and a reducing agent, mixing the lithium source solution, the reducing agent and the plurality of iron phosphate precursor particles to form a precursor slurry of lithium iron phosphate doped with vanadium; and
coating the precursor slurry of lithium iron phosphate doped with vanadium on outer surfaces of a plurality of lithium vanadium phosphate particles by following steps:
dividing the precursor slurry of lithium iron phosphate doped with vanadium into a first part, a second part, and a third part;
dispersing the plurality of lithium vanadium phosphate particles in the first part to obtain a plurality of first compound particles;
separating and drying the plurality of first compound particles from the first part;
dispersing the plurality of first compound particles in the second part to form a plurality of second compound particles;
separating and drying the plurality of second compound particles from the second part;
dispersing the plurality of second compound particles in the third part; and
separating and drying the plurality of third compound particles from the third part.

2. The method of claim 1, wherein in the step of providing the mixed solution, a mol ratio between a mol sum of vanadium, iron, and the phosphate is in a range from about 1:0.8 to about 1:1.2.

3. The method of claim 1, wherein a chemical formula of the lithium iron phosphate doped with vanadium is Li$Fe_{(1-3x/2)}V_xPO_4$, wherein X is the number of vanadium ions per lithium iron phosphate molecule, and X is in a range from about 0.01 to about 0.08.

4. The method of claim 1, wherein the vanadium source material is ammonium metavanadate, vanadium pentoxide, hypovanadic oxide, or vanadium tetrachloride.

5. The method of claim 1, wherein the plurality of micro particles is made of rigid material undissolved in the solvent.

6. The method of claim 1, wherein a volume percentage of the micro particles in the mixed solution is in a range from about 15% to about 50%.

7. The method of claim 1, wherein in the step of stirring the mixed solution, a temperature of the mixed solution is in a range from about 25° C. to about 50° C.

8. The method of claim 7, wherein a reaction time between the iron salt and the phosphate material is in a range from about 40 minutes to about 2 hours.

9. The method of claim 1, wherein the iron phosphate precursor particles comprise a plurality of iron phosphate hydrate particles, the plurality of iron phosphate hydrate particles is heated to a temperature from about 400° C. to about 700° C. in protecting gas for about 2 hours to about 24 hours to remove the crystal water in the iron phosphate hydrate particles before the step of mixing the lithium source solution, the reducing agent, and the plurality of iron phosphate precursor particles to form a lithium iron phosphate precursor slurry.

10. The method of claim 1, wherein the reducing agent is capable of schizolysis to form carbon material, a mol ratio between lithium element in the lithium source material, phosphate element in the iron phosphate precursor particles, and carbon element in the carbon material is in a range from about 1:1:1 to about 1.2:1:1.3.

11. The method of claim 1, wherein the mixed solution is stirred in a magnetic agitator, and a power of the magnetic agitator is in a range from about 50 W/L to about 60 W/L.

12. The method of claim 1, wherein the lithium iron phosphate precursor slurry is dried and then heat-treated at a temperature from about 500° C. to about 850° C. for about 8 hours to about 40 hours.

13. A method for making a lithium battery cathode material comprising:
providing a reactor and a mixed solution including a solvent, an iron salt material, a vanadium source material, and a phosphate material;
adding the mixed solution and a plurality of micro particles into the reactor, and adding an alkaline solution into the mixed solution until the mixed solution has a pH value ranging from about 1.5 to 5, and stirring the mixed solution to form a plurality of particles of iron phosphate precursor doped with vanadium, wherein the stirring the mixed solution comprises maintaining the plurality of micro particles in the mixed solution during reacting the iron salt and the vanadium source material with the phosphate material, and the plurality of particles of iron phosphate precursor doped with vanadium is disposed in the mixed solution to form a liquid mixture;
adding a lithium source solution and a reducing agent into the liquid mixture to form a slurry of lithium iron phosphate precursor doped with vanadium; and
coating the slurry of lithium iron phosphate precursor doped with vanadium on outer surfaces of a plurality of lithium vanadium phosphate particles by following steps:
dividing the precursor slurry of lithium iron phosphate doped with vanadium into a first part, a second part, and a third part;
dispersing the plurality of lithium vanadium phosphate particles in the first part to obtain a plurality of first compound particles;
separating and drying the plurality of first compound particles from the first part;
dispersing the plurality of first compound particles in the second part to form a plurality of second compound particles;
separating and drying the plurality of second compound particles from the second part;
dispersing the plurality of second compound particles in the third part; and
separating and drying the plurality of third compound particles from the third part.

14. The method of claim 13, wherein the mixed solution is transmitted continuously in the reactor at a flow rate of 100 ml/hour to about 150 ml/hour.

15. The method of claim 14, wherein the mixed solution is transmitted in the reactor from a bottom part of the reactor, and the particles of iron phosphate precursor doped with vanadium overflow from the reactor continuously.

16. The method of claim 13, further comprising a step of separating the micro particles from the liquid mixture by a filtering method.

17. The method of claim 13, wherein a chemical formula of the lithium iron phosphate doped with vanadium is $LiFe_{(1-3x/2)}V_xPO_4$, wherein X is the number of vanadium ions per lithium iron phosphate molecule, and X is in a range from about 0.01 to 0.08.

18. A method for making a lithium battery cathode material comprising:
providing a reactor and a mixed solution including a solvent, an iron salt material, a vanadium source material and a phosphate material;
adding the mixed solution and a plurality of micro particles into the reactor, and adding an alkaline solution into the mixed solution until the mixed solution has a pH value ranging from about 1.5 to 5, and stirring the mixed solution to form a plurality of particles of iron phosphate precursor doped with vanadium, wherein the stirring the mixed solution comprises maintaining the plurality of micro particles in the mixed solution during reacting the iron salt and the vanadium source material with the phosphate material, and the plurality of particles of iron phosphate precursor doped with vanadium is disposed in the mixed solution to form a liquid mixture;
separating the particles of iron phosphate precursor doped with vanadium from the liquid mixture and heating the particles of iron phosphate precursor doped with vanadium to a temperature from about 400° C. to about 700° C.;
providing a lithium source solution and a reducing agent, and mixing the lithium source solution, the reducing agent and the particles of iron phosphate precursor to form a slurry of lithium iron phosphate precursor doped with vanadium; and
coating the slurry of lithium iron phosphate precursor doped with vanadium on outer surfaces of a plurality of lithium vanadium phosphate particles by following steps:
dividing the precursor slurry of lithium iron phosphate doped with vanadium into a first part, a second part, and a third part;
dispersing the plurality of lithium vanadium phosphate particles in the first part to obtain a plurality of first compound particles;
separating and drying the plurality of first compound particles from the first part;
dispersing the plurality of first compound particles in the second part to form a plurality of second compound particles;
separating and drying the plurality of second compound particles from the second part;
dispersing the plurality of second compound particles in the third part; and
separating and drying the plurality of third compound particles from the third part.

19. The method of claim 1, wherein the coating the precursor slurry of lithium iron phosphate doped with vanadium on outer surfaces of a plurality of lithium vanadium phosphate particles further comprises heating the plurality of third compound particles.

20. The method of claim 13, wherein the coating the slurry of lithium iron phosphate precursor doped with vanadium on outer surfaces of the plurality of lithium vanadium phosphate particles further comprises heating the plurality of third compound particles.

* * * * *